US010614039B2

(12) United States Patent
Davis et al.

(10) Patent No.: US 10,614,039 B2
(45) Date of Patent: *Apr. 7, 2020

(54) TESTING OF LOCK MANAGERS IN COMPUTING ENVIRONMENTS

(71) Applicant: International Business Machines Corporation, Armonk, NY (US)

(72) Inventors: Willard A. Davis, Rosendale, NY (US); James C. Davis, Blacksburg, VA (US)

(73) Assignee: International Business Machines Corporation, Armonk, NY (US)

( * ) Notice: Subject to any disclaimer, the term of this patent is extended or adjusted under 35 U.S.C. 154(b) by 224 days.

This patent is subject to a terminal disclaimer.

(21) Appl. No.: 15/478,675

(22) Filed: Apr. 4, 2017

(65) Prior Publication Data
US 2018/0285380 A1 Oct. 4, 2018

(51) Int. Cl.
*G06F 16/176* (2019.01)
*G06F 16/10* (2019.01)
(Continued)

(52) U.S. Cl.
CPC .......... *G06F 16/1774* (2019.01); *G06F 16/10* (2019.01); *G06F 16/182* (2019.01);
(Continued)

(58) Field of Classification Search
CPC .... G06F 16/1774; G06F 16/182; G06F 16/10; G06F 16/2343; G06F 16/1858; G06F 16/2365
See application file for complete search history.

(56) References Cited

U.S. PATENT DOCUMENTS 5,175,852 A 12/1992 Johnson et al.
5,202,971 A 4/1993 Henson et al.
(Continued)

FOREIGN PATENT DOCUMENTS

EP 0278313 A3 10/1990
EP 0278312 B1 10/1994
(Continued)

OTHER PUBLICATIONS

"Locktests.c". Oct. 18, 2012 [retrieved on Mar. 27, 2019]. Retrieved from the Internet< URL: https://github.com/linux-test-project/ltp/blob/37550cf5a86c7ca7424a2a318dd64e550f13f5df/testcases/network/nfsv4/locks/locktests.c > (Year: 2012).*
Anonymous, "Smarter locks in version controlled system", An IP.com Prior Art Database Technical Disclosure, IP.com No. IPCOM000207624D, IP.com Electronic Publication Date: Jun. 7, 2011, 3 pages.
(Continued)

*Primary Examiner* — James E Richardson
(74) *Attorney, Agent, or Firm* — Jamar K. Ray

(57) ABSTRACT

A lock manager configured for locking files is tested. As part of the test and based on a lock assignment plan, a process acquires locks on portions of the files. Based on a lock testing plan, a second process performs a lock verification for a portion of the locked portions. A result of this lock verification is compared to its expected result. Based on an updated lock assignment plan, the process transitions from the locks to other locks on other portions of the files. Based on an updated lock testing plan, the second process performs a second lock verification for a portion of the other locked portions. A result of this second lock verification is compared to its expected result. Based at least in part on the two comparisons, the lock manager is evaluated.

6 Claims, 9 Drawing Sheets

(51) Int. Cl.
 *G06F 16/182* (2019.01)
 *G06F 16/18* (2019.01)
 *G06F 16/23* (2019.01)
(52) U.S. Cl.
 CPC ...... *G06F 16/1858* (2019.01); *G06F 16/2343* (2019.01); *G06F 16/2365* (2019.01)

(56) References Cited

U.S. PATENT DOCUMENTS

| | | | | |
|---|---|---|---|---|
| 5,285,528 | A | * | 2/1994 | Hart .......................... G06F 9/52 710/200 |
| 6,009,269 | A | * | 12/1999 | Burrows ................. G06F 9/524 714/38.1 |
| 6,105,049 | A | | 8/2000 | Govindaraju et al. |
| 6,144,983 | A | | 11/2000 | Klots et al. |
| 6,363,387 | B1 | | 3/2002 | Ponnekanti et al. |
| 6,499,031 | B1 | | 12/2002 | Hopmann et al. |
| 6,606,626 | B1 | | 8/2003 | Ponnekanti |
| 6,651,123 | B1 | | 11/2003 | Hutchison et al. |
| 6,922,694 | B2 | | 7/2005 | Daynes |
| 7,149,737 | B1 | | 12/2006 | Luo et al. |
| 7,181,452 | B1 | | 2/2007 | Luo et al. |
| 7,680,794 | B2 | | 3/2010 | Verma et al. |
| 8,433,693 | B2 | | 4/2013 | Rasmussen |
| 8,645,650 | B2 | | 2/2014 | Brassow |
| 8,719,432 | B1 | | 5/2014 | Vermeulen et al. |
| 8,856,745 | B2 | * | 10/2014 | Li ....................... G06F 9/44521 717/124 |
| 8,869,127 | B2 | | 10/2014 | Dolby et al. |
| 9,449,041 | B2 | * | 9/2016 | Nie ..................... G06F 16/2343 |
| 2004/0189439 | A1 | | 9/2004 | Cansino |
| 2004/0199818 | A1 | * | 10/2004 | Boilen .................... G06F 11/36 714/25 |
| 2006/0090168 | A1 | | 4/2006 | Ogasawara et al. |
| 2006/0136926 | A1 | | 6/2006 | Goldick |
| 2008/0276256 | A1 | | 11/2008 | Ogasawara et al. |
| 2008/0294892 | A1 | * | 11/2008 | Molnar ................... G06F 9/526 713/164 |
| 2008/0307138 | A1 | | 12/2008 | Goldick |
| 2009/0307530 | A1 | | 12/2009 | Tarta |
| 2011/0083043 | A1 | * | 4/2011 | Chan ................... G06F 11/0709 714/37 |
| 2012/0030657 | A1 | * | 2/2012 | Gao ....................... G06F 9/524 717/128 |
| 2012/0089735 | A1 | * | 4/2012 | Attaluri .................. G06F 9/526 709/226 |
| 2012/0159446 | A1 | * | 6/2012 | Jentsch ..................... G06F 9/44 717/124 |
| 2013/0047163 | A1 | * | 2/2013 | Marathe .............. G06F 11/3608 718/104 |
| 2013/0332910 | A1 | * | 12/2013 | Ganai ................. G06F 11/3692 717/131 |
| 2015/0120925 | A1 | | 4/2015 | Das |
| 2016/0292213 | A1 | * | 10/2016 | Stanfill .................. G06F 9/466 |
| 2017/0153969 | A1 | * | 6/2017 | Kshirsagar .......... G06F 11/3688 |

FOREIGN PATENT DOCUMENTS

| | | |
|---|---|---|
| EP | 1187017 A2 | 3/2002 |
| WO | 2015116208 A1 | 8/2015 |
| WO | 2017180185 A1 | 10/2017 |

OTHER PUBLICATIONS

Anonymous, "Command serialization and data protection using efficient multi-node locks", An IP.com Prior Art Database Technical Disclosure, IP.com No. IPCOM000203082D, IP.com Electronic Publication Date: Jan. 18, 2011, 5 pages.

Anonymous, "Method and Apparatus for Workload-Aware Synchronization Mechanism in Multi-threaded Java Applications", An IP.com Prior Art Database Technical Disclosure, IP.com No. IPCOM000227693D, IP.com Electronic Publication Date: May 13, 2013, 5 pages.

Devulapalli et al., "Distributed Queue-based Locking using Advanced Network Features", Proceedings of the 2005 International Conference on Parallel Processing (ICPP'05), 8 pages.

Unknown, "NFStest", From Linux NFS, last modified on Nov. 23, 2015, printed on Jan. 20, 2017, 8 pages.

Wikipedia, "Conway's Game of Life", From Wikipedia, the free encyclopedia, last modified on Jan. 18, 2017, printed Jan. 20, 2017, 11 pages.

Unknown, "samba-team/samba", printed Mar. 27, 2017, 5 pages, https://github.com/samba-team/samba/blob/master/ctdb/utils/ping_pong/ping_pong.c, Feb. 24, 2017.

Unknown, "linux-test-project/ltp", printed Mar. 27, 2017, 3 pages, https://github.com/linux-test-project/ltp/tree/master/testcases/network/nfsv4/locks, Feb. 14, 2017.

Unknown, "linux-test-project/ltp", printed Mar. 27, 2017, 3 pages, https://github.com/linux-test-project/ltp/blob/master/testcases/network/nfsv4/locks/README, Oct. 18, 2012.

Unknown, "linux-test-project/ltp", printed Mar. 27, 2017, 1 page, https://github.com/linux-test-project/ltp/blob/master/testcases/network/nfsv4/locks/deploy_info, Oct. 18, 2012.

Unknown, "ceph/teuthology", printed Mar. 27, 2017, 4 pages, https://github.com/ceph/teuthology/blob/master/teuthology/task/lockfile.py, May 30, 2014.

Unknown, "ceph/teuthology", printed Mar. 27, 2017, 1 page, https://github.com/ceph/teuthology/blob/master/teuthology/util/flock.py, Feb. 24, 2017.

Unknown, "c9 / node-gnu-tools", printed Mar. 27, 2017, 1 page, https://github.com/c9/node-gnu-tools/blob/master/findutils-src/tests/test-fcntl.c, May 3, 2012.

Unknown, "samba / tests / fcntl_lock.c", printed Mar. 28, 2017, 3 pages, https://github.com/samba-team/samba/blob/master/tests/fcntl_lock.c, Apr. 4, 2012.

Davis et al., "Testing of Lock Managers in Computing Environments", U.S. Appl. No. 15/790,217, filed Oct. 23, 2017.

IBM, List of IBM Patents or Patent Applications Treated as Related, Oct. 20, 2017, 2 pages.

Davis et al., "Testing of Lock Managers in Computing Environments", U.S. Appl. No. 15/885,883, filed Feb. 1, 2018.

Accelerated Examination Support Document, U.S. Appl. No. 15/885,883, dated Dec. 11, 2017, 37 pgs.

IBM, List of IBM Patents or Patent Applications Treated as Related, Jan. 24, 2018, 2 pages.

Liao, "Design and Evaluation of MPI File Domain Partitioning Methods under Extent-Based File Locking Protocol", IEEE Transactions on Parallel and Distributed Systems, vol. 22, No. 2, Feb. 2011, pp. 260-272.

Ambler, "Test-Driven Development of Relational Databases", IEEE Software, May/Jun. 2007, pp. 37-43.

* cited by examiner

FIG. 7

Table 701:

| | A | B | C |
|---|---|---|---|
| 1 | READ$_2$ | WRITE$_1$ | |
| 2 | READ$_2$ | READ$_1$ | |
| 3 | WRITE$_3$ | | |

Table 702:

| | A | B | C |
|---|---|---|---|
| 1 | WRITE$_1$ | | |
| 2 | READ$_{1,2}$ | | |
| 3 | READ$_2$ | WRITE$_3$ | |

TESTING OF LOCK MANAGERS IN COMPUTING ENVIRONMENTS

BACKGROUND

The present disclosure relates generally to the field of data processing, and, more particularly, to the testing of lock managers in computing environments.

Locking schemes are used in many computing environments to help prevent conflicts like those that can occur when multiple entities (e.g., applications, processes) attempt to access a file concurrently. These conflicts can be resolved through recourse to a lock manager, which may be a component of a file system, an operating system kernel, or a specialized application. Unix-like operating systems commonly implement lock in a file system or an operating system kernel, exposing system calls, such as fcntl and flock, as interfaces between the processes accessing the locks and the lock manager. Some locking mechanisms, such as Linux's flock, only allow locking at the file level. Others, like the POSIX fcntl interface, allow file locking on individual bytes or byte ranges. These locks are referred to as record locks.

Locks may be mandatory or advisory. Mandatory locks are enforced by the operating system, and may prevent all access to locked objects from any entities not holding a lock. Under an advisory locking scheme, entities agree to use a particular locking scheme as implemented by a particular lock manager when acquiring and dropping locks.

Because advisory locks are not mandatory, they are only enforced by the lock manager when its APIs are invoked. This means that every read and write on a file is not being checked for legality by the lock manager, as in a mandatory locking system. This may result in increased performance. However, the tradeoff is that a buggy application (e.g., one with incorrect locking code) or an application that is designed to ignore advisory locks can interfere with applications correctly using the advisory locks.

Locks may be exclusive ("write") or shared/non-exclusive ("read"). At most one entity at a time can hold an exclusive lock on an object (e.g., a file). One or more entities may hold a shared lock on an object. Exclusive and shared locks are mutually exclusive: no shared locks can be held when an entity holds an exclusive lock is held, and no exclusive locks can be held when at least one entity holds a shared lock.

SUMMARY

Embodiments of the present disclosure include a method for iteratively testing a lock manager configured for locking a set of files stored in a file system. As part of the method and based on a lock assignment plan, a first process of a plurality of processes acquires a first plurality of locks on a first plurality of portions of the set of files. Based on a lock testing plan, a second process of the plurality of processes performs a first lock verification for a first portion of the plurality of portions. A result of this first lock verification is compared to its expected result. Based on an updated lock assignment plan, the first process transitions from the first plurality of locks to a second plurality of locks on a second plurality of portions of the set of files. Based on an updated lock testing plan, the second process performs a second lock verification for a second portion of the second plurality of portions. A result of this second lock verification is compared to its expected result. Based at least in part on the two comparisons, the lock manager is evaluated.

Embodiments of the present disclosure further include a system for testing a locking mechanism. The system includes a processor and a memory. The processor is in communication with the memory and is configured to obtain instructions from the memory that cause the processor to perform a method. As part of the method, lock assignment information for the set of files is distributed among processes. Based on the distributed lock assignment information, a first process acquires a lock on a first portion of the set of files and a second process acquires a lock on a second portion of the set of files. Lock testing information for the set of files is also distributed among the processes. Based on the distributed lock testing information, the first process attempts to acquire a lock on the second portion. A result of this attempted lock is compared to its expected result. Based on the comparison, the locking mechanism is evaluated.

Embodiments of the present disclosure further include a computer program product. The computer program product is a computer readable storage medium has program instructions embodied thereon. The program instructions are configured to cause a computer to perform a method for integrity testing a lock manager for locking a set of files stored in a computing environment. The integrity testing includes a set of testing iterations that each have a lock phase followed by a verification phase. For a testing iteration, responsibility for acquiring a set of initial locks is assigned among processes such that, upon assignment, each process is responsible for acquiring at least one initial lock on at least one portion of the set of files. During the lock phase of the testing iteration, the processes acquire the assigned set of initial locks. Also for the testing iteration, responsibility for attempting to acquire a set of test locks is assigned among the processes such that, upon assignment, each process is responsible for attempting to acquire at least one test lock on at least one portion of the set of files currently locked by an initial lock that was acquired by another process during the lock phase. During the verification phase of the testing iteration, the processes attempt to acquire the assigned set of test locks. The results of these attempted test lock acquisitions are compared to the expected results of these attempted acquisitions. The integrity of the lock manager is evaluated based on these comparisons.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 7 illustrates a block diagram of an example set of files in a first lock state transitioning to a second lock state using a different update algorithm for each process.

Figure 1:
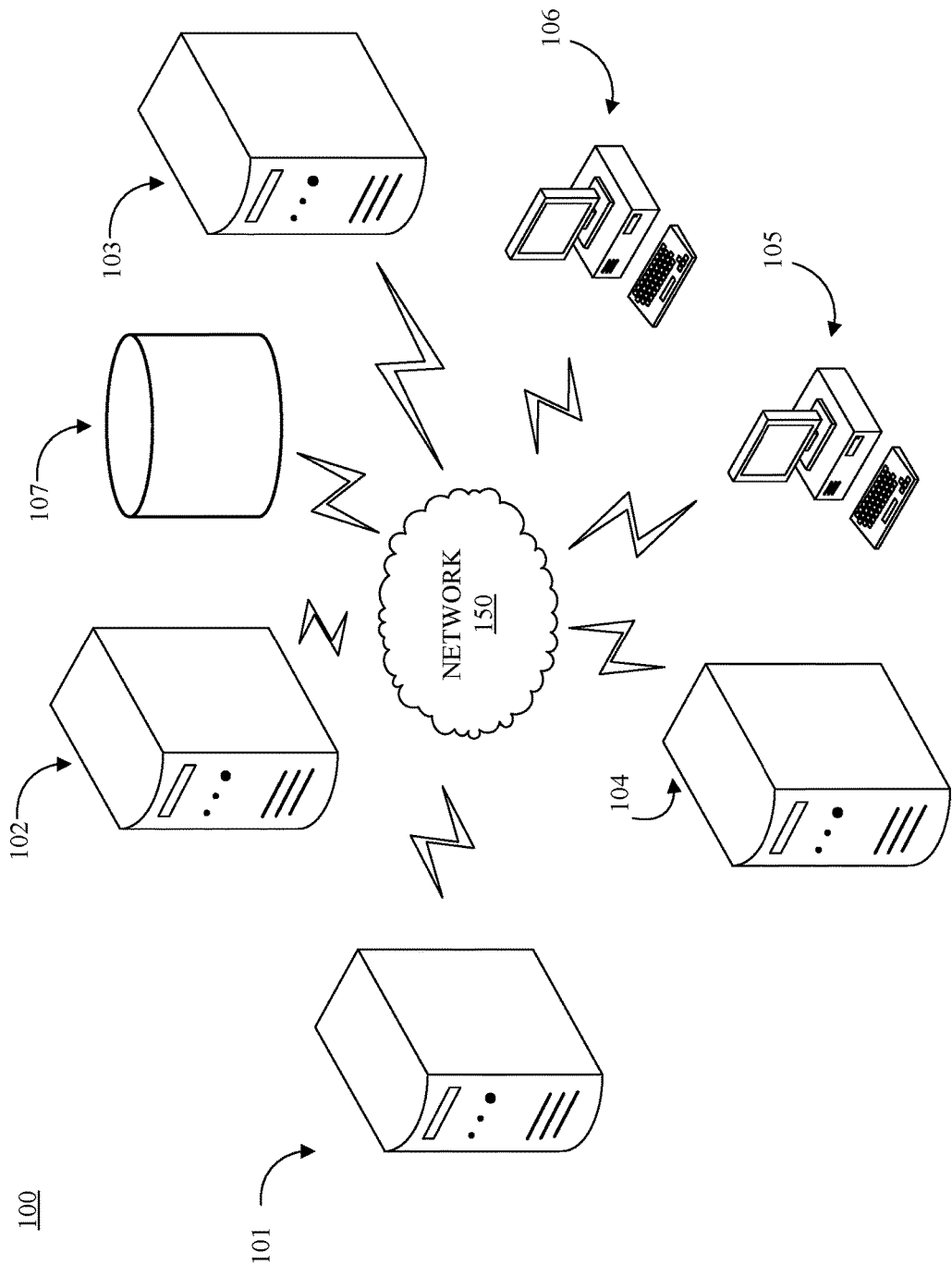
FIG. 1 illustrates a block diagram of an example computing environment, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to the testing of lock managers in computing environments. While the present disclosure is not necessarily limited to such applications, various aspects of the disclosure may be appreciated through a discussion of various examples using this context.

In modern computing environments, lock managers in general, and lock managers using advisory locking schemes in particular, are almost always implicitly trusted by software developers and, ultimately, by end users. Lock managers are commonly implemented in support of file systems, and the POSIX standard includes the fcntl API specifically facilitating the locking of files. In many instances, a lock manager may be initially implemented without ever having been tested for correctness. Moreover, updates to a file system's code are often made and released to consumers with little or no testing to confirm that the file system's lock manager has not been adversely impacted by the updated code. Embodiments of the present disclosure stand for the proposition that this trust is misplaced in many situations and that robust techniques for validating the initial and ongoing integrity of file lock managers are necessary. This is particularly true given that lock managers are generally exposed to user applications via system calls and any combination of lock requests are possible. This means that a malicious user, upon discovery a weakness in the lock manager, could readily exploit that weakness.

As used herein, a failed lock manager may refer to one that breaks its contract with a set of processes by incorrectly granting or refusing to grant a lock request by a process. One factor about lock manager failures that make them particularly difficult to test for (and prevent), is that they often only occur under a very narrow set of circumstances (e.g., particular combinations of specific locks, processes, lock requests, and/or locked objects). Though an exhaustive search of the test space is impossible given the near-infinite number of these possible combinations, an effective test should cover a wide range of scenarios (e.g., with different processes acquiring and testing different locks in different situations and on different file regions). This gives the test a much better chance of detecting errors before they become a problem.

Without robust tests, a particular lock manager may be implemented and used in a computer system for a long period of time before stressful workloads cause the lock manager to fail. While lock manager failures are relatively rare, they can be quite devastating. A buggy lock manager can cause tremendous costs, particularly in terms of file corruption or loss.

Embodiments of the present disclosure avoid these detrimental situations by employing strong validity testing at early stages. In particular, issues in the implementation of a locking scheme by a locking mechanism are expected to occur in the form of incorrect responses to concurrent, conflicting requests for file access. Because of this, embodiments of the present disclosure are designed to verify the proper functioning of a locking mechanism in a realistic fashion by simulating a wide variety of both realistic and extreme file-locking workloads intended to mimic potential real-world workloads of a lock manager. Such embodiments are capable of launching a wide of range of test locking requests in a short period of time. More specifically, such embodiments are able to work at roughly the same speed at which locks are handled by the locking mechanism under normal (or even high stress) operating conditions.

In some embodiments, methods for testing the integrity of lock managers may be employed by software developers or other users of computer environments. These methods may include processes acting together at the direction of a leader process (which may be a test process or the lock manager itself) to perform tests. Each test may include multiple test iterations with each iteration including a lock phase and a verification phase.

During the lock phase, one or more processes are provided lock assignment information and acquire, in accordance with a lock assignment plan derived from (or included in) the information, initial locks on regions of test files (e.g., shared files stored in the file system) via the lock manager. In embodiments where multiple processes are potentially responsible for acquiring these initial locks, each process may acquire none, some, or all of the set of initial locks to be acquired. During a verification phase, the lock manager is tested through one or more verification rounds. In each verification round, one or more processes (which may be the same or different from the processes that acquired the initial locks) are provided lock testing information and perform, in accordance with a lock testing plan derived from (or included in) in the information, lock verifications on the regions of the files over which the initial locks are held.

After the desired number of verification rounds are completed, a new test iteration begins. The transition to the new test iteration may include an update phase in which the initial locks are updated based on one or more algorithms. This new set of initial locks then undergo new lock verifications in another verification phase. This cycle continues until the desired number of test iterations are completed. Upon completion of the test iterations, the lock manager is evaluated based on the results of the lock verifications as compared to the expected results of the lock verifications. Based on the evaluation, flaws in the lock manager's code may be detected and corrected.

In some embodiments, locking may be used in local, single-node computing environments. Implementing a lock manager may be relatively straightforward on such a single computer system and can be done with standard atomic operations. Despite this relative simplicity of implementations of single-computer lock managers, test processes are still desirable. In the single-node environment, where locks are acquired locally, no network traffic may be required. In such an instance, the lock manager of a locking mechanism may be a daemon process, a module of the kernel, or integrated in a file system manager.

In contrast, other locking may occur in distributed, multi-node computing environments. There may be more concern about the correct implementations of lock managers intended to function correctly and efficiently in distributed settings (as opposed to single-computer settings). In a distributed setting, a lock manager daemon that runs on one or more nodes may be used as part of a file system. Clients hosting processes requesting locks may communicate over networks with this lock manager, which determines whether a given lock request should be granted.

In either a single-node or distributed environment, lock requests are often handled more quickly than I/O requests (e.g., file reads and writes). In the local setting, I/O is disk-bound while lock requests are memory and/or CPU bound. In the distributed setting, I/O requests may require sending a large input over the network to a server that then writes the input to disk storage; lock requests, on the other hand, may be much less resource intensive because they usually require the transfer of significantly less data. This means lock requests generally take significantly less time than their associated I/O requests to complete. Because of this relative rate-limiting nature of I/O, some embodiments do not perform I/O requests when testing lock managers. For example, rather than iteratively acquiring files locks and then accessing the locked files, embodiments may repeatedly proceed to the next set of locks without taking the time to read or write to the locked files. This greatly increases the speed of testing in terms of the number of lock tests that can be performed in a given period of time.

Referring now to the figures, shown in FIG. 1 is a block diagram of an example computing environment 100, in accordance with embodiments of the present disclosure. Computing environment 100 may be representative of an environment in which lock managers are tested, an environment in which lock managers are used during the course of normal operations, or both. While computing environment 100 is depicted as a multi-node environment, it should be noted that embodiments may be implemented in single-node environments instead.

In some embodiments, the computing environment 100 includes multiple computers, including nodes 101, 102, 103, and 104 and clients 105 and 106 in communication with each other and with database 107 over network 150. The network 150 may be implemented by any number of any suitable remote or local communications media (e.g., wide area network (WAN), local area network (LAN), Internet, intranet, hardwire, wireless link). In some embodiments, the computing environment 100 may be implemented within a cloud computing environment. Consistent with various embodiments, a cloud computing environment includes a network-based, distributed data processing system. Further, the cloud computing environment may include any number of computers (e.g., hundreds or more), disposed within one or more data centers and configured to share resources over the network 150.

In some embodiments, nodes 101-104 may represent servers or groups of servers. In embodiments, each server may include a local terminal for accessing data thereon. The servers act as hosts for processes. These processes may include applications or suites of applications that are used locally or provided over the network 150 to one or more of the clients 105, 106 (e.g., in the form of web services). In some embodiments, these processes include lock managers as well as programs specifically designed for the testing of these lock managers.

In some embodiments, database 107 host files that are accessible (in terms of reads and writes) by the processes running on the nodes 101-104. During normal application operation, these processes may lock portions of the files that they are currently accessing. These files may include files that are stored in a file system within (or otherwise associated with) the database 107.

Figure 2:
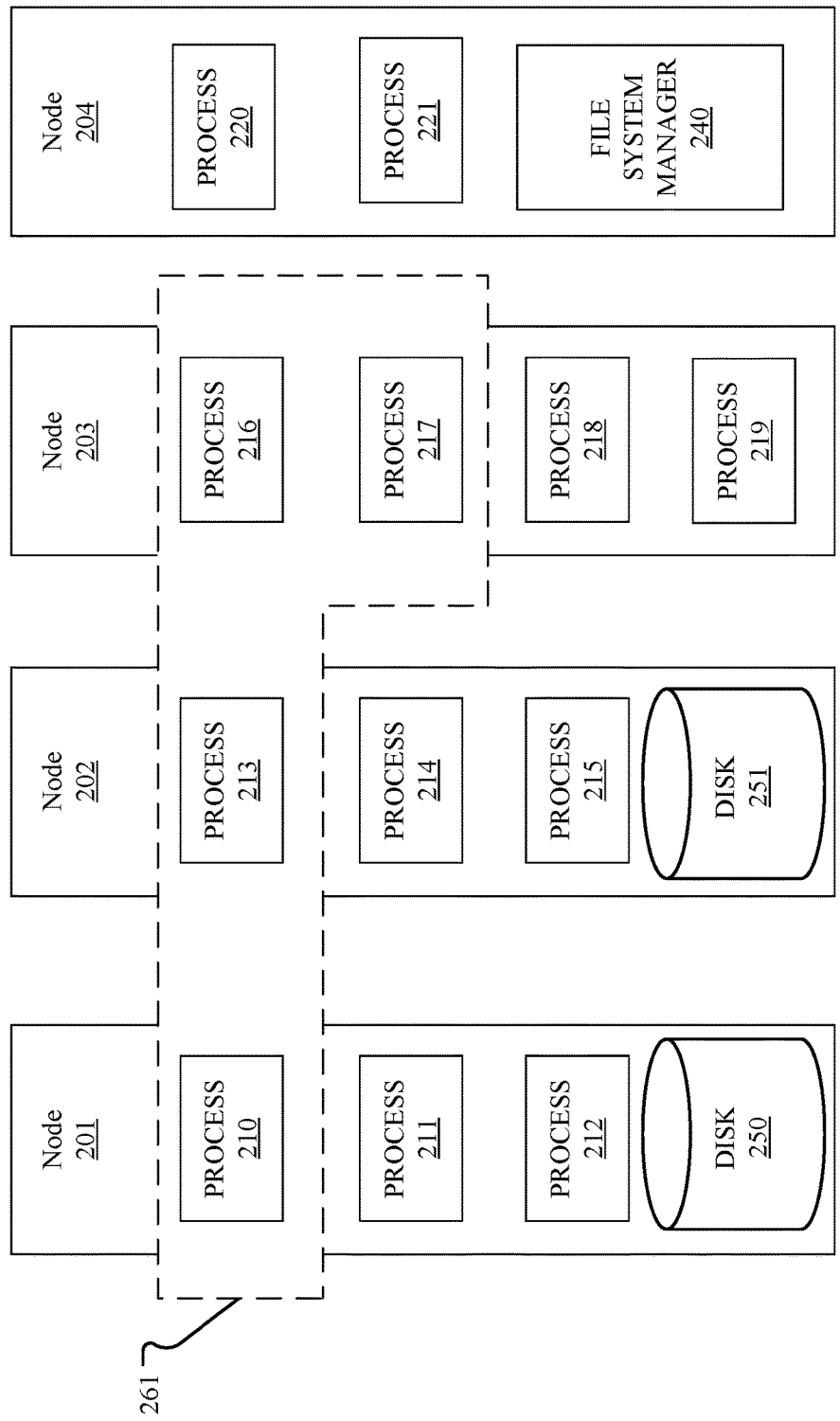
FIG. 2 illustrates a block diagram of a distributed file system, wherein nodes host a plurality of processes used in testing a locking mechanism incorporating a file system manager, in accordance with embodiments of the present disclosure.

Referring now to FIG. 2, shown is a block diagram of distributed file system 200, wherein nodes 201-204 host a plurality of processes 210, 213, 216, and 217 used in testing a locking mechanism incorporating a file system manager 240, in accordance with embodiments of the present disclosure. In some embodiments nodes 201-204 may be the same as or substantially similar to nodes 101-104 of FIG. 1.

As shown, node 201 hosts processes 210, 211, 212; node 202 hosts processes 213, 214, and 215; node 203 hosts processes 216, 217, 218, and 219; and node 204 hosts processes 220 and 221. A portion of the processes (as represented by those enclosed in the dashed-line shape 261) may be have been started up specifically for use in testing the locking mechanism, in particular file system manager 240. Disks 250 and 251 store files for the file system 200. These files may include the files used (e.g., locked and unlocked) for testing purposes. While two disks 250 and 251 are depicted in the example of FIG. 2, it should be noted that some embodiments may be implemented in environments having a variety of types and numbers of storage structures. For example, in some embodiments, files may be stored in a shared disk environment wherein nodes are connected to shared disks via a switching fabric, such as a storage area network.

In some embodiments, processes used for testing a locking mechanism may be testing processes per se (e.g., not designed or used primarily for other purposes). These processes may be separate instances of a single testing application or instances of different testing applications. In some embodiments, a testing application may generate a master process and multiple slave processes that act at the direction of the master process. For example, process 210 may be a master process that distributes lock testing plans and lock assignment plans to the slave processes 213, 216, and 217. Based on these plans, the slave processes 213, 216, and 217 may acquire, via the file system manager 240, locks over designated portions of files in Disk 250 and/or Disk 251. Then the slave processes 213, 216, and 217 may verify theses locks, via the file system manager 240, and provide the lock verification results to the master process 210 for analysis. In other embodiments, no master process is required, and the test processes instead work as peers to generate and distribute lock testing plans and lock assignment plans.

In some embodiments, it may be significant that each testing process (e.g., processes 210, 213, 216, and 217) be a separate instance of a testing application rather than different threads within a single instance. This is because a file system manager may not be able to distinguish between different threads of a single instance (e.g., on a Linux-based system), reducing the effectiveness and realism of the testing in such a system.

Throughout the present disclosure, references are often made to the UNIX fcntl system call and the syntax and functionality of that program are often relied upon for explanation. It is to be understood, however, that these references are for explanatory purposes only and that embodiments of the disclosure may utilize a variety of locking mechanisms that rely on different syntax and/or functionality.

Referring now to Table 1, shown is a chart listing expected outcomes of lock requests under various conditions, in accordance with embodiments of the present disclosure.

TABLE 1

| Current State for the Region | Lock Request | Result |
| --- | --- | --- |
| No Lock | Take read lock | Lock granted |
| No Lock | Take write lock | Lock granted |
| Another process holds read lock | Take read lock | Lock granted |
| Another process holds read lock | Take write lock | Lock not granted |
| This process holds read lock | Take read lock | Existing locks preserved |
| This process holds the only read lock | Take write lock | Read lock upgraded to write lock |
| This process and other process(es) hold a read lock | Take write lock | Lock not granted; existing locks preserved |
| Another process holds write lock | Take read lock | Lock not granted |
| Another process holds write lock | Take write lock | Lock not granted |
| This process holds write lock | Take read lock | Write lock downgraded to read lock |
| This process holds write lock | Take write lock | Lock not granted |

Table 1 provides an expected result that will occur when a process submits a lock request (e.g., attempt to acquire a new lock) on a particular region of storage (e.g., a particular portion of a set of (i.e., one or more) files). For example, if the process submits a read lock request on a region where there is currently no lock, then the lock request is expected to be granted. For another example, if the process attempts to take a write lock on a region where another process already has a write lock, then the lock request is expected to be rejected.

In embodiments, Table 1 is premised on three underlying valid lock situations for a given byte range of a given file: (i) no write locks nor read locks are held; (ii) exactly one process holds a write lock and no additional locks can be obtained; or (iii) any number of processes hold read locks and no write locks can be obtained.

Referring now to Table 2, shown is a chart listing fcntl requests associated with byte-range locking, in accordance with embodiments of the present disclosure.

TABLE 2

| Command | Format |
| --- | --- |
| non-blocking acquire write lock on this byte range | F_SETLK_WRITE(file, range) |
| blocking acquire write lock on this byte range | F_SETLKW_WRITE(file, range) |
| non-blocking acquire read lock on this byte range | F_SETLK_READ(file, range) |
| blocking acquire read lock on this byte range | F_SETLKW_READ(file, range) |
| query whether or not a described write lock could be obtained on this byte range | F_GETLK_WRITE(file, range) |
| query whether or not a described read lock could be obtained on this byte range | F_GETLK_READ(file, range) |
| unlock this byte range | F_UNLK(file, range) |

Table 2 provides a listing of several requests and their corresponding formats. For example, in order to acquire a non-blocking read lock on a particular byte range a request in the form of F_SETLK_READ(file, range) may be made by the requesting process to the lock manager (locking mechanism). As shown, these requests may be blocking (causing the lock manager to wait until the requested access is available on the requested region before returning a lock result to the requesting process) or non-blocking (causing the lock manager to immediately respond to the access request by either granting or denying the requested lock).

Figure 3:
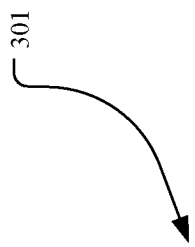
FIG. 3 illustrates a block diagram of an example set of files having various portions locked by four processes, in accordance with embodiments of the present disclosure.

Referring now to FIG. 3, shown is a block diagram of an example set of files 301 having various portions locked by four processes, in accordance with embodiments of the present disclosure. The processes are labeled with their process identifiers, Process 1 to Process 4. These four processes may be, for example, processes 210, 213, 216, and 217 of FIG. 2. Five files (File A to File E) are depicted with each file comprising seven bytes (Byte 1 to Byte 7) for a total of thirty-five bytes in the set of files 301 used in the testing. It should be understood that the set of files 301 is shown in simplified form for clarity of explanation. In some embodiments, there may be any number of files that are of any size (i.e., each file may include any number of bytes), and locks may be on byte ranges of varying sizes.

In the depicted example, the set of files 301 has ten unlocked bytes and the remaining twenty-five bytes are locked by one or more of the processes. Some of the locks are read locks and some are write locks. As shown, some processes have locks over byte ranges that incorporate entire files (e.g., Process 1's read lock on all of File A, Process 4's write lock on all of File E). Other locks are on portions of a file (e.g., Process 3's write lock on a portion of File C). Finally, it should also be noted that there are depicted instances where more than one process holds a read lock on a particular portion of a file (e.g., a byte of File D is read locked by three of the processes), while there are no instances of more than one process having a write lock on any particular file portion, or instances of overlapping write and read locks, as neither of these states would be legal according to the locking semantics.

Figure 4:
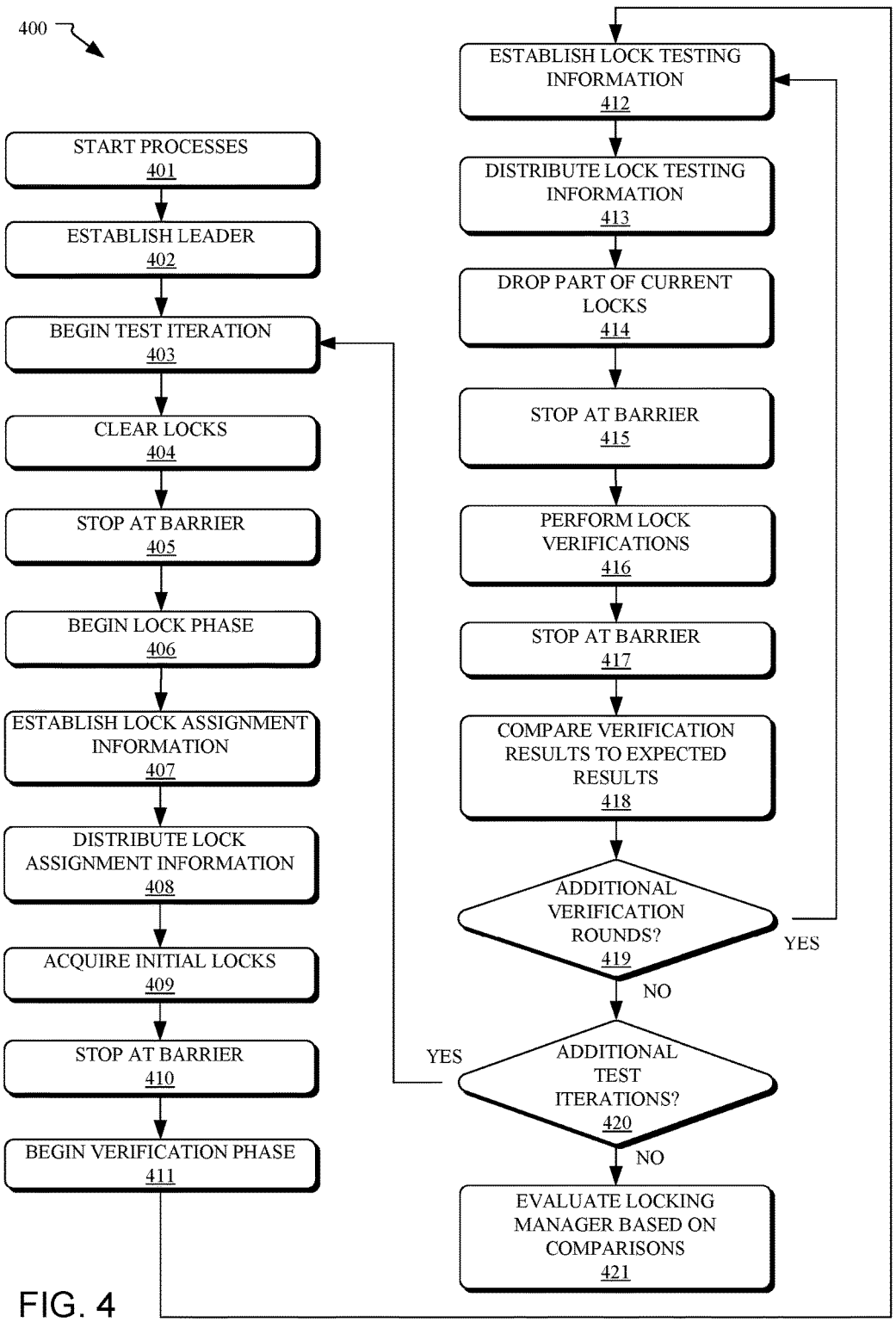
FIG. 4 illustrates a flow diagram of an example method for testing the integrity of a lock manager, in accordance with embodiments of the present disclosure.

Referring now to FIG. 4, shown is a flow diagram of an example method 400 for testing the integrity of a lock manager, in accordance with embodiments of the present disclosure. In some embodiments, operations of the method 400 may be performed by a user, a computer, or a combination thereof. In some embodiments, operations of the method 400 may be performed automatically or periodically without human input (e.g., when a new code update is made to a file system to be tested). The method 400 may begin at operation 401, wherein the processes performing the testing are started up. This may include verifying access to the shared set of files to be used in the test and initializing variables as needed.

Per operation 402, a leader may be established. This leader may be one of the processes, a lock manager itself, or another program. This leader may serve to organize and synchronize the processes. The existence of a leader, and the amount of work performed by the leader if one exists (as distinct from non-leader processes) may vary significantly among embodiments. For example, in some embodiments, much of the workload (e.g., setting up detailed instructions for locking and determining exactly which process to perform which lock) may fall on the leader. In other embodiments, more of the workload may be handled by the processes themselves (e.g., where the leader establishes a general algorithm by which processes can determine which locks are to be attempted and distributes the general algorithm for the processes to parse themselves).

Per operation 403, a first test iteration begins. The number of test iterations performed in testing may vary from as few as one to dozens or more depending on the nature of the test and how thorough the testing must be done. Per operation 404, the current locks on the set of files are cleared (e.g., dropped or released). This ensures that the test iteration begins at a known baseline, without extra locks that will hamper the validity of the testing. Per operation 405, the processes stop at a collective barrier. This barrier means that no process may proceed onto the next step of the method until all of the processes have reached the barrier. This barrier, as well as the other barriers described in method 400, serve to align the processes and avoid potential collisions or race conditions, except when these are desired.

Per operation 406, the lock phase of the first test iteration begins. During this phase, the initial locks on the set of files are put in place. Per operation 407, lock assignment information is established. This information may include an indication of the initial locks that each process is to acquire (a lock plan) or may include other content from which this lock plan can be derived by the processes themselves. Per operation 408, the lock assignment information is distributed to the processes. In some embodiments, the leader may transmit the initial lock assignments to the processes (referred to as "seeding" the processes). This transmission may be identical for all processes such that all processes have knowledge of what locks the other processes will be acquiring. In this alternative, this transmission may be different for each process and may include only the locking assignments for that process. In such situations, the processes may not know (e.g., may be agnostic as to) the locks to be acquired by the other processes or even, in some cases, the existence of the other processes or the test itself. In some embodiments, the locking assignments serve to designate which process is responsible for acquiring which initial locks (on which regions).

Per operation 409, the initial locks are acquired by the processes on the correct portions of the set of files. This may take the form of the processes requesting locks and receiving confirmation of the lock requests (e.g., via fcntl commands). As used herein, a "portion of" the set of files may include (i) a byte range within a file, (ii) a byte range encompassing parts (or all) of multiple files within the set of files, and/or (iii) an entire file or group of files within the set of files. Per operation 410, each process waits at a barrier until all of the initial locks are acquired by the processes.

Per operation 411, a verification phase of the first test iteration begins. Per operation 412, lock testing information is established. This information may include an indication of the test locks that each process is to acquire (a lock testing plan), may include other content from which this test lock indication can be derived by the processes themselves, or may include other instructions for which initial locks each process is supposed to verify (or challenge). Per operation 413, the lock testing information is distributed to the processes. In some embodiments, the leader may transmit the lock testing information Like the transmission of lock assignment information, this transmission may be identical for all processes or may be different for each process and may include only the test lock instructions for that process. In some embodiments, the lock assignment information and the lock testing information may be sent together (e.g., operations 407 and 412 may occur at the same time and operations 408 and 413 may occur at the same time). In some embodiments, the locking testing information serves to designate which process is responsible for testing which initial locks (on which regions). This may include assigning responsibility for attempting to acquire a particular set of (test) locks or querying the lock manager about the availability of such locks.

Per operation 414, if the lock testing information includes any locks to be dropped by the processes, these locks are dropped (released) before new test locks are acquired. And, per operation 415, the processes stop at another barrier. This releasing of (initial) locks to be dropped before acquiring new (test) locks prevents certain possible race conditions or other issues. For example, if the lock testing information indicates that a first process is supposed to drop a write lock on a particular file and a second process is supposed to take a read lock on that file, the order in which these two events occur is significant. If the write lock is not released first then the read lock will fail. These concepts are discussed in more detail below with reference to FIG. 5.

Per operation 416, lock verifications are performed in accordance with the lock testing information. In some embodiments, this may involve attempting to obtain test locks on portions of the file on which conflicting locks are held by other processes. These test locks may then be held for an indeterminate period (e.g., for use in subsequent verification) or relinquished (released) immediately as part of the testing. In other embodiments, these lock verifications may involve making inquiries about whether a particular lock could be obtained by the inquiring process. These inquires may take the form of F_GETLK_READ(file, range) requests or F_GETLK_WRITE(file, range) requests. Per operation 417, the processes stop at another barrier, and, per operation 418, the verification results are compared to expected results for each verification. In some embodiments, any time a discrepancy is detected between a result of lock verification and its expected result, a snapshot is taken of debugging data at the time of the error and an error flag is raised in the system log. Acquiring this information may be helpful for later detecting the source of the error and taking corrective action.

In order to verify a given byte range, different tests can be undertaken that are based on the current state (e.g., locked or unlocked) of the byte range. Ultimately, there is an extremely large set of tests (verifications) that can be performed as part of a verification phase of a test iteration. These tests can include lock acquisition requests expected to succeed as well as lock acquisition tests expected to fail. Referring now to Table 3, shown is a chart listing the expected outcomes of fcntl requests (that could be made as part of lock verifications) under various conditions, in accordance with embodiments of the present disclosure.

TABLE 3

| State of byte range | Read lock test | Write lock test | Get lock test |
| --- | --- | --- | --- |
| Unlocked | Take and relinquish a read lock. This should succeed | Take and relinquish a write lock. This should succeed | GETLK: should report that both a read and a write lock could be taken |
| Read lock owned by another process (or multiple other processes, including this process) | Take and relinquish a read lock. This should succeed | Attempt to take a write lock; it should fail. | GETLK: should report that a read lock can be taken, but not a write lock |
| Read lock owned by this process only | Take and relinquish a read lock. This should succeed (functionally, a noop) | Attempt to take a write lock; it should succeed (upgrading a read lock to a write lock) | GETLK: should report that both a read and a write lock could be taken |
| Write lock owned by another process | Attempt to take a read lock; this should fail | Attempt to take a write lock; this should fail | GETLK should report that no other locks can be taken, and should corectly report the pid of the process with the lock |
| Write lock owned by this process | Attempt to take a read lock; this should succeed (lock downgrade) | Attempt to take a write lock: this should succeed (a noop) | GETLK: should report that both a read and a write lock could be taken |

As shown, Table 3 provides expected results for read lock tests (e.g., using F_SETLK_READ(file, range) requests), write lock tests (e.g., using F_SETLK_WRITE(file, range) requests), and get lock tests (e.g., using F_GETLK_READ (file, range) requests and/or F_GETLK_WRITE(file, range) requests) on byte ranges having various statuses. For example, if the portion a set of files under test is unlocked, then an attempt to take (and relinquish) a read lock should be successful, an attempt to take (and relinquish) a write lock should also be successful, and a get lock request should report that both a read and a write lock can be taken for the region. Note that in each test case (e.g., for each test lock), the return codes (from the lock manager) are checked to make sure responses are appropriate and the locking mechanism is acting correctly. In an advisory lock setting, this may be a limitation on how applications (e.g., processes) can determine the success or failure of a particular lock request. In non-advisory (mandatory) locking settings, attempted read or writes could also be monitored.

During a given verification phase, each process may perform all possible tests or only subset of them. In some embodiments, the work of carrying out the various tests may be distributed amongst various processes, with or without overlap in testing regions. One possible detriment of having little or no overlap in testing regions is that the lack of overlap makes a test iteration less robust and less likely to catch errors. For example, if a Process 1 holds a write lock on a given region (e.g., a given portion of a file), then neither a Process 2 nor a Process 3 should be able to obtain a read lock on the region. However, there is a chance that Process 2 would (correctly) fail to acquire the read lock, while Process 3 would (incorrectly) succeed in acquiring the read lock, for example, due to an error in the lock manager that treats requests from different nodes differently. Without overlapping test regions, there is less of a chance that an error (such as an incorrect lock by Process 3) would be detected.

On the other hand, having multiple processes test a given region may have its own set of detriments. One potential difficulty with overlapping test regions is that if multiple processes are verifying a same region, they may need to take care to not interfere with each other. For example, if two processes verify (test) the same unlocked region by acquiring a write lock at the same time, then one process will acquire the write lock and the other will fail. In some embodiments, this situation is addressed by having each process be made aware of the identity of other verifiers in the region (or at least the fact that there are other verifiers in the region), and instructing the processes not to attempt to acquire write locks in regions with multiple verifiers. However, a lock manager should generally be robust to competing and mutually exclusive requests, and, in some embodiments, such scenarios may be explored and tested.

In some embodiments, some of the regions will have multiple verifiers and other regions will not. For example, in one embodiment, each process verifies the byte offset that is divisible by its process identifier (e.g., processes 2 and 7 would verify byte offset 14).

In some embodiments, it may be significant that most (or at least some) of the regions are verified (tested) by a process that is different from the process holding the initial lock on all or part of that region. Likewise, it may be significant that all (or most) of the processes holding the initial locks are involved in the testing of regions with initial locks held by other processes. Finally, in some embodiments, the one or more processes holding the initial locks may be different from the one or more processes testing these initial locks.

In some embodiments, the number of times that each initial lock is tested may be different for each initial lock but is within a range bounded by a minimum and a maximum determined by the testing application. For example, each initial lock may be tested at least once but no more than five times in a given verification phase. Furthermore the types of test locks that are requested may also vary significantly. For example, one initial lock may undergo three read lock tests, while another undergoes a write lock test and get lock test, and yet another undergoes two write lock tests.

Returning now to FIG. 4, the method proceeds to operation 419 where a determination is made as to whether additional verification rounds are needed for the verification phase of the first test iteration. This determination may be made based on several factors, including, for example, the results of prior verification rounds, the number of processes used in the test, and the importance of the test (e.g., in terms of the costs of failure that could result in subsequent normal operations if the locking mechanism fails). If more verification rounds are desired, then the method returns to operation 412 so that another lock testing plan for the initial locks can be established and operations 412-418 can be repeated as necessary.

Once it is determined in operation 419 that no more verification rounds are desired, the method proceeds to operation 420. Per operation 420, a determination is made as to whether additional testing iterations are needed. This determination, like the determination about additional verification rounds, may be made based on a number of factors. If more test iterations are desired, then the method returns to operation 403 to begin a new (second) test iteration and to repeat operations 403-419 as necessary. In some embodiments, it may be significant that most (or at least some or parts of some) of the regions that are initially locked by a particular process during one test iteration are initially locked by a different process (or set of processes) during a subsequent test iteration. This may help to ensure that the integrity testing is robust and covers a wide range of conditions.

In some embodiments the transition from one testing iteration to the next may incorporate an update phase. The update phase may incorporate (or overlap with) one or more operations of the method 400. The fundamental purpose of the update is to change the states of the initial locks during the next testing iteration so that another set of lock verifications can be performed. In some embodiments, an update may use transition functions to determine the preferred shift from an initial lock state of one testing iteration to an initial lock state of the next testing iteration. Examples of such transition functions are described herein, particularly with reference to FIGS. 6 and 7. Furthermore, in some embodiments, the types of initial locks acquired during an initial lock state of one testing iteration dictate the types (e.g., read or write) of the initial locks acquired during the next testing iteration. Based on the particular update algorithm applied during the transition, the types of the initial locks may change or remain the same. For example, an initial read lock on a first portion during a first iteration may transition to a initial write lock on a second portion during a second iteration.

Once all of the testing iterations are completed, the method 400 proceeds to operation 421 wherein the lock manager is evaluated based on expected result versus actual result comparisons (e.g., the comparisons made in operation 418). In some embodiments, the evaluation may take the form of a pass/fail, with the lock manager only passing if there are no discrepancies between actual results and expected results of the tests. In some embodiments, the results of the tests and any failures may be provided to a user (e.g., software developer) so that the user can correct any issues (such as buggy processes) and, potentially, repeat the testing after the issues are corrected (e.g., by correcting the code in the buggy process).

In some embodiments, to create an appropriate amount of stress on the lock manager under test in a relatively short amount of time, many of the operations of method 400 may need to be performed quickly. To meet this goal, emphasis should be placed on minimizing the CPU, memory, and network traffic that are used during the testing operations. For realism, read or write I/O traffic may be included in some embodiments, but lock-only stress tests without I/O may be desirable so as to prevent the I/O, rather than the lock manager, being the bottleneck on the number that can be completed.

While race conditions and conflicting locking requests between test processes may be detrimental to testing in some situations (particularly during an update phase), there may be other situations where these conflicts may be less harmful or even helpful to creating a robust testing scenario. For example, during a given verification phase, race conditions may intentionally be created so that the testing is more representative of the normal operations that a lock manager will face, particularly during periods of high system activity. Moreover, in embodiments, these race conditions may not interfere with the expected results of test locks, especially when acquired test locks are immediately released. When F_SETLKW is used, the process who does not obtain the lock will wait, and no error should be reported, simplifying the handling of this type of race. When F_SETLK is used, all processes but the one that obtains the lock should receive errors, requiring additional handling.

While an example embodiment of the method 400 is described herein, many variants on this method may be possible. For example, in some embodiments, particularly those involving non-advisory locks, comparisons between actual and expected results of attempted test lock acquisitions may not be made between each verification round. Instead, the processes may be given an initial set of locks and then a number of test locks to iterate through. Once all of the iterations are completed, the expected result of all of these iterations combined is compared with the actual results.

Furthermore, in some embodiments, the method 400 may be a test on the locking mechanism more generally rather than on just the lock manager itself. For example, there may be other points of failure in the locking mechanism beyond the lock manager (such as an interface program) that may be detected in the testing as well.

Figure 5:
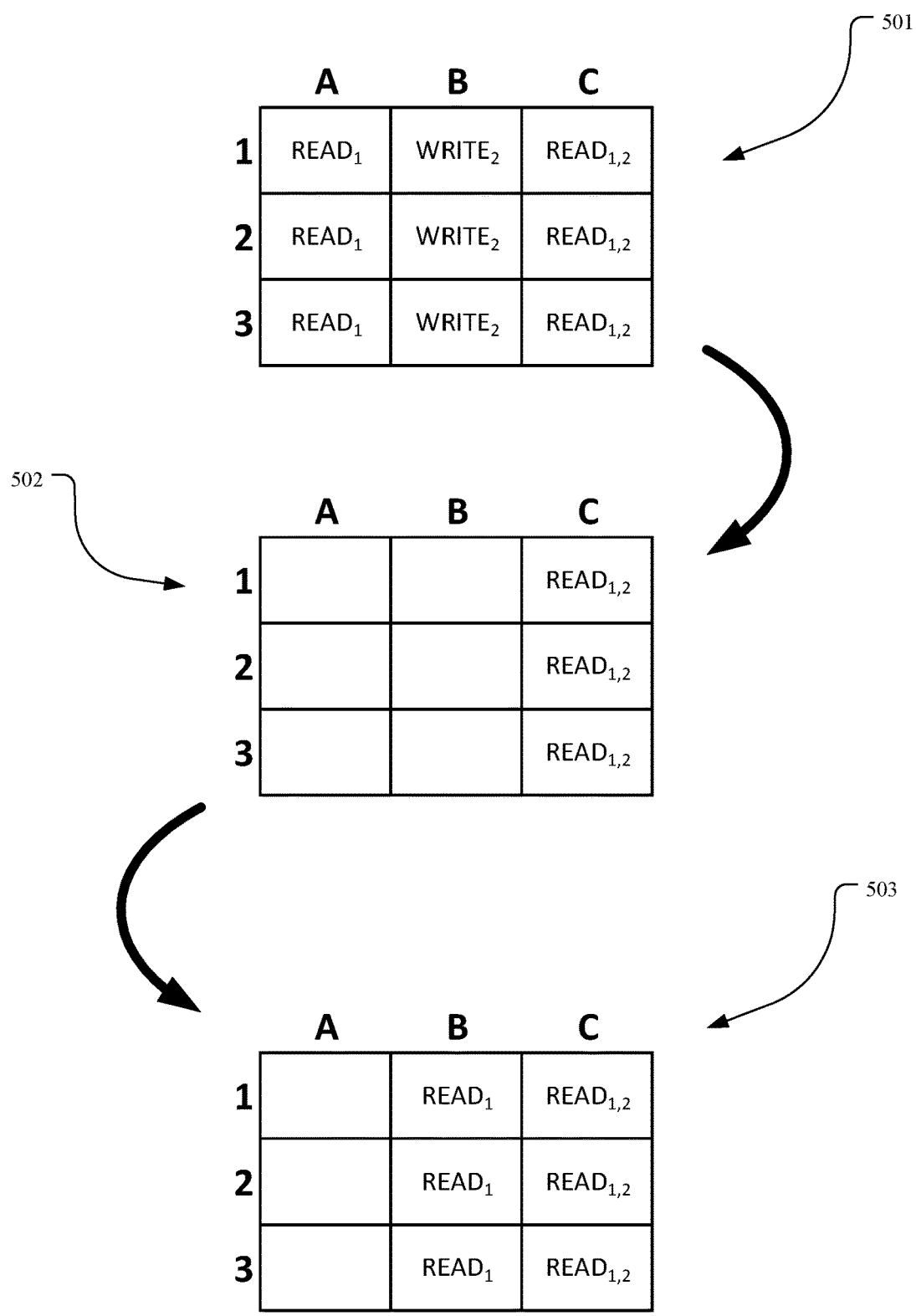
FIG. 5 illustrates a block diagram of an example set of files transitioning from a first lock state to a third lock state via an intermediate second lock state wherein locks are released, in accordance with embodiments of the present disclosure.

Referring now to FIG. 5, shown is a block diagram of an example set of files transitioning from a first lock state 501 to a third lock state 503 via an intermediate second lock state 502 wherein locks are released, in accordance with embodiments of the present disclosure. As described herein, it is significant in some embodiments that old locks be released before new locks are acquired in order to avoid erroneous test results. FIG. 5 depicts this transition occurring on an example set of test files (i.e., Files A, B, and C). In this example, in the first lock state 501 (e.g., initial lock state), each of Processes 1 and 2 hold at least one lock (e.g., initial lock) on a region. Specifically, Process 1 holds a read lock on File A, Process 2 holds a write lock on File B, and both processes hold read locks on File C.

The example continues with the processes receiving instructions (e.g., lock testing information) from a leader. These instructions direct Process 1 to drop its read lock on File A and to acquire a read lock on File B. These instructions also direct Process 2 to drop its write lock on File B. Based on these instructions, the processes first transition to second lock state 502 by releasing the appropriate locks. At that point, the processes reach a barrier that they cannot pass until they confirm that the other process has also reached the barrier. Next, the processes acquire the new set of locks (e.g., test locks), which, in this example, is a read lock by Process 1 on File B. It should be noted that by dropping the write lock on File B before allowing Process 1 to acquire a read lock on File A helps to avoid a conflict between locks of the processes in this example. In summary, in this transition phase, processes will first drop the locks they will no longer hold in the next state, wait at a barrier, and then acquire the locks they will hold in the next state.

Figure 6:
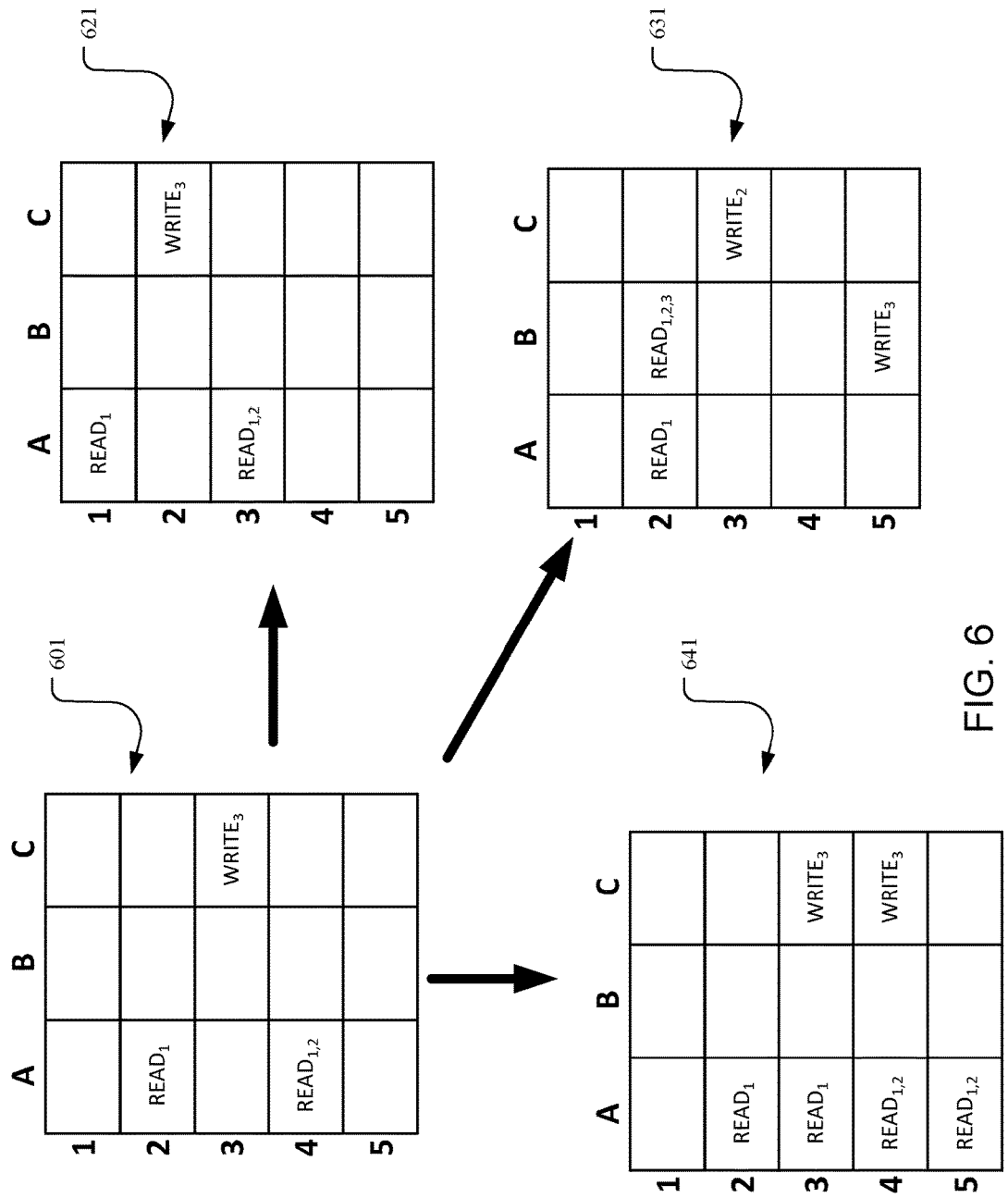
FIG. 6 illustrates a block diagram of an example set of files in a first lock state having three possible transitions to three potential second lock states, in accordance with embodiments of the present disclosure.

Referring now to FIG. 6, shown is a block diagram of an example set of files in a first lock state 601 having three possible transitions to three potential second lock states 621, 631, or 641, in accordance with embodiments of the present disclosure. As described herein, there are many possible algorithms that may be used when processes transition between test iterations during locking mechanism tests. These algorithms may rely on the initial locks in a given testing iteration as the input into the algorithm used to establish lock assignment information that includes initial locks for the next testing iteration, as may occur, for example, during an update phase.

FIG. 6 depicts three possible transitions from first lock state 601 based on three different update algorithms. The first lock state 601 is depicted with Process 1 holding read locks on Bytes 2 and 4 of File A, Process 2 holding a read lock on Byte 4 of File A, and Process 3 holding a read lock on Byte 3 of File C. As a first example update, potential second lock state 621 shows the results of applying a "Simple Up" update algorithm to first lock state 601. A Simple Up algorithm causes each process to drop its existing locks and acquire other locks at the byte ranges (of the same size) "above" its existing locks. As a second example update, potential second lock state 631 shows the results of applying a random update algorithm to first lock state 601. A random algorithm causes each process to maintain existing locks and/or acquire other locks randomly among the set of files based on the output of a random number generator. As a third example update, potential second lock state 641 shows the results of applying a "Greedy Down" update algorithm to first lock state 601. A Greedy Down algorithm causes each process to maintain its existing locks and acquire other locks at the byte ranges below its existing locks.

Referring now to FIG. 7, shown is a block diagram of an example set of files in a first lock state 701 transitioning to a second lock states 702 using a different update algorithm for each process, in accordance with embodiments of the present disclosure. It should be noted that as long as each process is aware of the update algorithms used by all other processes to update their respective locks, each process can correctly predict the next lock state, whether or not the update algorithm is identical across all processes. In other words, in this example, the next lock state across all processes can be computed by each process individually, eliminating the need for a leader to communicate this information and further increase the potential load on the lock manager.

In some embodiments, a tiebreaker algorithm may be used when two or more processes desire to acquire conflicting locks (in accordance with their update algorithms or within a verification round or otherwise). One example of a tiebreaker algorithm is for each process to have a priority number (based on its process identifier or otherwise), and the process with the higher priority wins whenever there is a conflict. In some embodiments, when only parts of regions overlap, the losing process may still acquire the desired lock over the remainder of its region (i.e., the bytes of its region that are not in conflict).

FIG. 7 depicts a first lock state 701 with Process 1 holding a read lock on Byte 2 of File B and a write lock on Byte 1 of File B, Process 2 holding read locks on Bytes 1 and 2 of File A, and Process 3 holding a write lock on Byte 3 of File A. In this example, Process 1 is instructed to apply a "Simple Left" update algorithm, Process 2 is instructed to apply a "Greedy Down" update algorithm, and Process 3 is instructed to apply a "Greedy Right" update algorithm. A tiebreaker algorithm that gives the lower-numbered process higher priority is applied for conflicts.

Continuing the example, there is a transition from the first lock state 701 to the second lock state 702. Two conflicts are resolved by the tiebreaker algorithm. Specifically, the write lock of Process 1 beats the read lock of Process 2 in Byte 1 of File A. This causes Process 2 to relinquish that read lock to avoid the conflict. For the second conflict, the read lock of Process 2 beats the write lock of Process 3 in Byte 3 of File A causing Process 3 to relinquish that write lock to avoid the second conflict. Note that in this example, locks may be relinquished before other locks are added in conflicting (overlapping) regions. While not depicted here, it is contemplated that other conflicts may result in a loser process not requesting (acquiring) a lock on a byte range that it would otherwise acquire.

Figure 8:
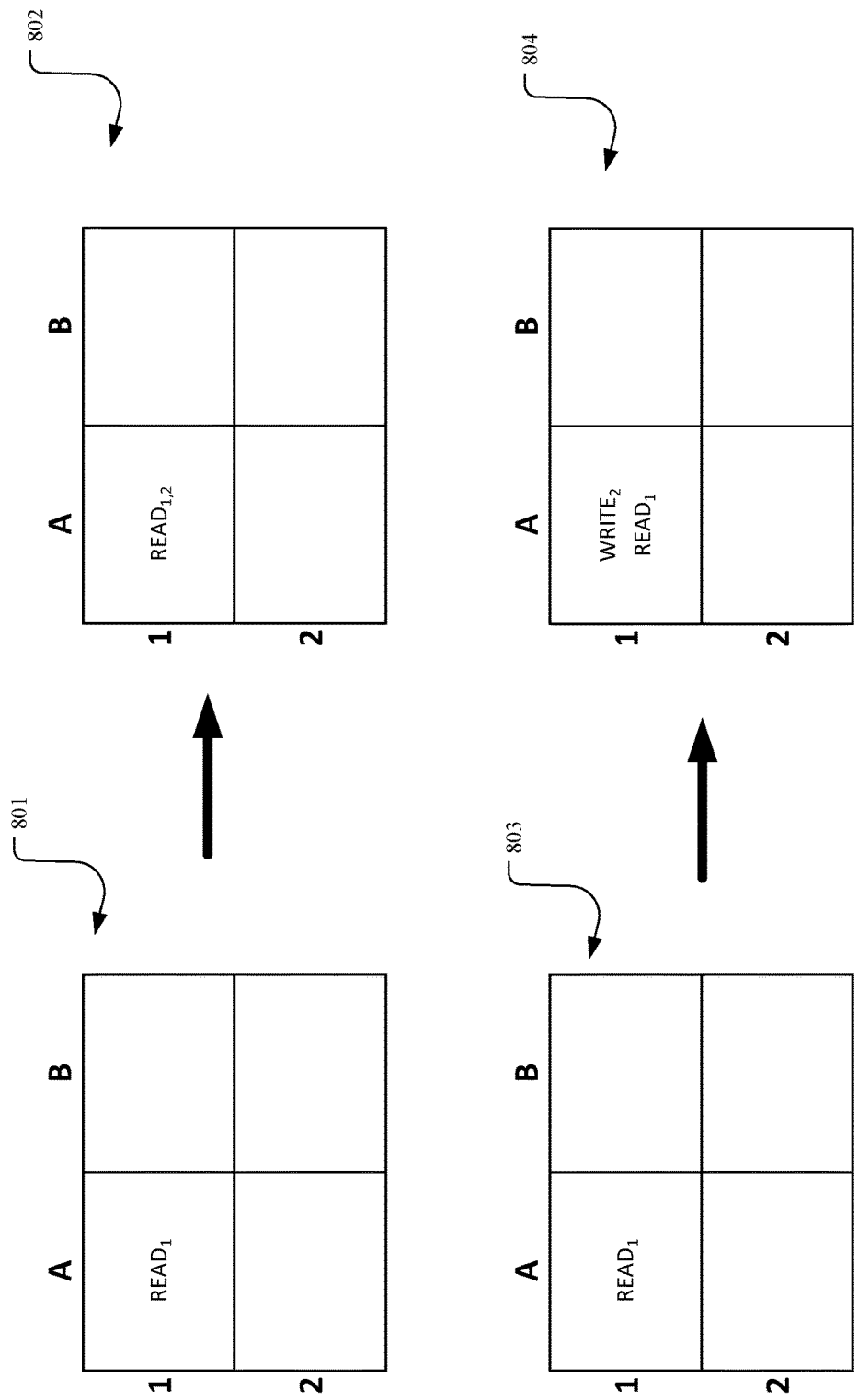
FIG. 8 illustrates a block diagram of two examples of a lock manager being tested, in accordance with embodiments of the present disclosure.

Referring now to FIG. 8, shown is a block diagram of two examples of a lock manager being tested, in accordance with embodiments of the present disclosure. In the first example, a set of files is in first lock state 801, wherein Process 1 holds a read lock on Byte 1 of File A. As part of a verification phase, Process 2 requests a read lock on that byte. In this instance, as shown in the second lock state 802, the lock manager correctly grants the request such that both Process 1 and Process 2 hold read locks on Byte 1 of File A. If the lock manager had instead denied the lock request from Process 2, the denial would have been in error, which would have been noted for further consideration and use in potential debugging of the lock manager.

In the second example, a set of files is in first lock state 803, wherein Process 1 holds a read lock on Byte 1 of File A. As part of a verification phase, Process 2 requests a write lock on that byte. In this new instance, as shown in the second lock state 804, the lock manager improperly grants the request such that both Process 1 holds a read lock on Byte 1 of File A and Process 2 holds a write on that same byte. Because this grant in error, it is noted for further consideration and use in potential debugging of the lock manager.

As discussed above, there may be more or different ways of testing a mandatory lock manager as opposed to an advisory lock manager. Both mandatory and advisory locks can be tested by attempting to acquire conflicting locks. For example, if a first process holds a write lock on a particular byte range, then a lock request by a second process (either read or write) on that byte range should fail, regardless of whether the locking manager is using advisory locks or mandatory locks. However, it may be possible to test mandatory locks using I/O requests rather than, or in addition to, lock requests. For example, in a mandatory locking scheme, if a first process holds a write lock on a file, then an attempt by a second process to read from or write to that file should fail. If such an access attempt is successful, then the lock manager failed and should be further evaluated. This type of testing would not be effective in an advisory locking scheme, given its advisory nature.

Some embodiments of the present disclosure may offer various technical computing advantages over the prior art. These computing advantages address problems arising in the realm of computer locking mechanisms and the associated problems of computer performance and reliability that occur when these locking mechanism fail. Implementation of embodiments of the method 400, for example, can result in improved system performance and technical computing advantages. Embodiments herein recognize that robust lock manager testing described herein can have significant advantages over less robust testing procedures that cannot be used to adequately predict when and under what conditions a locking mechanism will fail.

Figure 9:
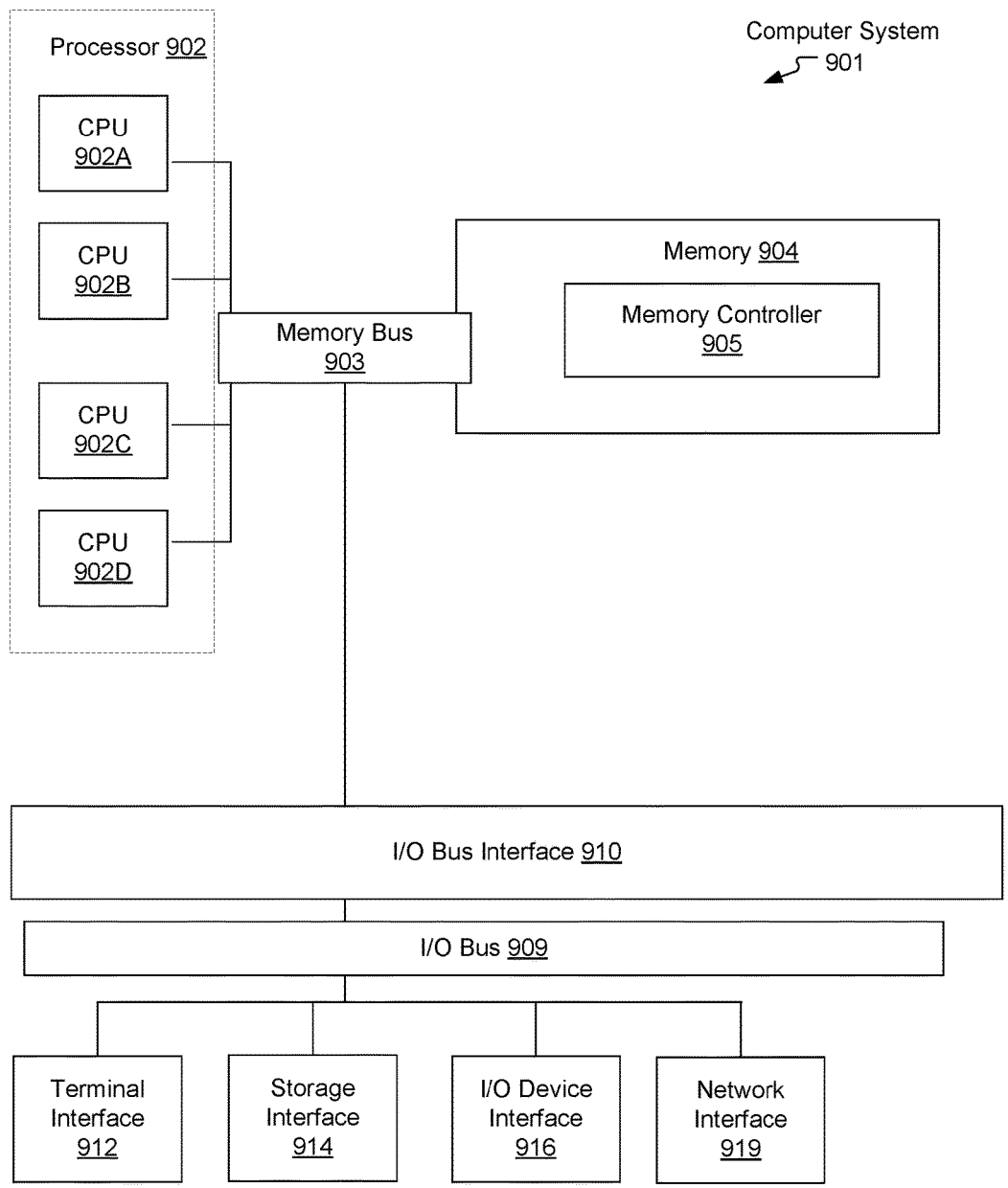
FIG. 9 illustrates a high-level block diagram of an example computer system that may be used in implementing embodiments of the present disclosure.

Referring now to FIG. 9, shown is a high-level block diagram of an example computer system (i.e., computer) 901 that may be used in implementing one or more of the methods or modules, and any related functions or operations, described herein (e.g., using one or more processor circuits or computer processors of the computer), in accordance with embodiments of the present disclosure. In some embodiments, the major components of the computer system 901 may comprise one or more CPUs 902, a memory subsystem 904, a terminal interface 912, a storage interface 914, an I/O (Input/Output) device interface 916, and a network interface 919, all of which may be communicatively coupled, directly or indirectly, for inter-component communication via a memory bus 903, an I/O bus 909, and an I/O bus interface unit 910.

The computer system 901 may contain one or more general-purpose programmable central processing units (CPUs) 902A, 902B, 902C, and 902D, herein generically referred to as the processor 902. In some embodiments, the computer system 901 may contain multiple processors typical of a relatively large system; however, in other embodiments the computer system 901 may alternatively be a single CPU system. Each CPU 902 may execute instructions stored in the memory subsystem 904 and may comprise one or more levels of on-board cache.

In some embodiments, the memory subsystem 904 may comprise a random-access semiconductor memory, storage device, or storage medium (either volatile or non-volatile) for storing data and programs. In some embodiments, the memory subsystem 904 may represent the entire virtual memory of the computer system 901, and may also include the virtual memory of other computer systems coupled to the computer system 901 or connected via a network. The memory subsystem 904 may be conceptually a single monolithic entity, but, in some embodiments, the memory subsystem 904 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 904 may contain elements for control and flow of memory used by the Processor 902. This may include a memory controller 905.

Although the memory bus 903 is shown in FIG. 9 as a single bus structure providing a direct communication path among the CPUs 902, the memory subsystem 904, and the I/O bus interface 910, the memory bus 903 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 910 and the I/O bus 909 are shown as single respective units, the computer system 901 may, in some embodiments, contain multiple I/O bus interface units 910, multiple I/O buses 909, or both. Further, while multiple I/O interface units are shown, which separate the I/O bus 909 from various communications paths running to the various I/O devices, in other embodiments some or all of the I/O devices may be connected directly to one or more system I/O buses.

In some embodiments, the computer system 901 may be a multi-user mainframe computer system, a single-user system, or a server computer or similar device that has little or no direct user interface, but receives requests from other computer systems (clients). Further, in some embodiments, the computer system 901 may be implemented as a desktop computer, portable computer, laptop or notebook computer, tablet computer, pocket computer, telephone, smart phone, mobile device, or any other appropriate type of electronic device.

It is noted that FIG. 9 is intended to depict the representative major components of an exemplary computer system 901. In some embodiments, however, individual components may have greater or lesser complexity than as represented in FIG. 9, components other than or in addition to those shown in FIG. 9 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A system for testing a locking mechanism, the system comprising:
   at least one memory; and
   at least one processor in communication with the at least one memory, the at least one processor configured to obtain instructions from the memory that cause the at least one processor to perform a method comprising:
   distributing, among a plurality of processes, lock assignment information for a set of files;
   acquiring, based on the distributed lock assignment information and by a first process of the plurality of processes, a lock on a first portion of the set of files;
   acquiring, based on the distributed lock assignment information and by a second process of the plurality of processes, a lock on a second portion of the set of files;
   distributing, among the plurality of processes, lock testing information for the set of files;
   attempting, based on the distributed lock testing information and by the first process, to acquire a lock on the second portion;
   comparing a result of the attempted lock and an expected result of the attempted lock; and
   evaluating, based at least in part on the comparing, the locking mechanism, wherein the method further comprises:
   distributing, among the plurality of processes, second lock assignment information for the set of files;
   determining, by the first process and using the first portion as an input into an update algorithm included in the distributed second lock assignment information, that a lock is to be acquired on a third portion of the set of files, wherein the update algorithm is configured to output that the lock on the third portion is a next lock to be acquired by the first process after relinquishing the lock on the first portion based on the fact that first process currently has the lock on the first portion;
   relinquishing, by the first process and based on the update algorithm, the lock on the first portion; and
   acquiring, by the first process and based on the determination, the lock on the third portion after the relinquishment of the lock on the first portion.

2. The system of claim 1, wherein the method further comprises:
   determining, by the second process and using the second portion as an input into a second update algorithm included in the distributed second lock assignment information, that a lock is to be acquired on a fourth portion of the set of files;
   relinquishing, by the second process and based on the second update algorithm, the lock on the second portion; and
   acquiring, by the second process and based on the determination that the lock is to be acquired on the fourth portion, the lock on the fourth portion.

3. The system of claim 1, wherein the method further comprises:
   determining, by the first process and based on a tiebreaker algorithm included in the distributed second lock assignment information, the tiebreaker algorithm configured to avoid conflicting lock acquisition attempts among the plurality of processes, not to acquire a lock on a fourth portion of the set of files.

4. A computer program product for iteratively testing a lock manager configured for locking a set of files stored in a file system, the computer program product comprising a computer readable storage medium, the computer readable storage medium having program instructions embodied therewith, the programs instructions configured, when executed by at least one computer, to cause the at least one computer to perform a method, the method comprising:
   acquiring, based on a lock assignment plan and by a first process of a plurality of processes, a first plurality of locks on a first plurality of portions of the set of files;
   performing, based on a lock testing plan and by a second process of the plurality of processes, a first lock verification for a first portion of the plurality of portions;
   comparing a first result of the first lock verification and a first expected result of the first lock verification;
   transitioning, based on an updated lock assignment plan and by the first process, from the first plurality of locks to a second plurality of locks on a second plurality of portions of the set of files, wherein the transitioning comprises:
      determining, by the first process and using the first plurality of portions as inputs into an update algorithm incorporated in the updated lock assignment plan, that the second plurality of locks are to be acquired on the second plurality of portions;
      relinquishing, by the first process and based on the update algorithm, the first plurality of locks; and
      acquiring, by the first process and based on the determination, the second plurality of locks;
   performing, based on an updated lock testing plan and by the second process, a second lock verification for a second portion of the second plurality of portions;
   comparing a second result of the second lock verification and a second expected result of the second lock verification;
   acquiring, based on the lock assignment plan and by a third process of a plurality of processes, a third plurality of locks on a third plurality of portions of the set of files;
   transitioning, based on the updated lock assignment plan and by the third process, from the third plurality of locks to a fourth plurality of locks on a fourth plurality of portions of the set of files, wherein the transitioning from the third plurality of locks to the fourth plurality of locks comprises:
      determining, by the third process and using the third plurality of portions as inputs into a second update algorithm incorporated in the updated lock assignment plan, that the fourth plurality of locks are to be acquired on the fourth plurality of portions;
      relinquishing, by the third process and based on the second update algorithm, the third plurality of locks; and
      acquiring, by the third process and based on the determination that the fourth plurality of locks are to be acquired, the fourth plurality of locks; and
   evaluating, based at least in part on the comparing the first result and first expected result and the comparing the second result and the second expected result, the lock manager, wherein the update algorithm is a Simple Up update algorithm and the second update algorithm is a Greedy Down update algorithm.

5. The computer program product of claim 4, wherein the performing the first lock verification comprises:
   querying, based on the lock testing plan and by the second process, the lock manager as to whether or not a read lock is currently obtainable for the first portion.

6. The computer program product of claim 5, wherein the performing the first lock verification further comprises:
   querying, based on the lock testing plan and by the second process, the lock manager as to whether or not a write lock is currently obtainable for the first portion.

\* \* \* \* \*